United States Patent
Karlsson

(10) Patent No.: US 7,075,482 B2
(45) Date of Patent: *Jul. 11, 2006

(54) DIRECTION FINDING METHOD AND SYSTEM USING TRANSMISSION SIGNATURE DIFFERENTIATION

(75) Inventor: Lars Karlsson, Santa Clara, CA (US)

(73) Assignee: Network Fab Corporation, Santa Clara, CA (US)

(*) Notice: Subject to any disclaimer, the term of this patent is extended or adjusted under 35 U.S.C. 154(b) by 193 days.

This patent is subject to a terminal disclaimer.

(21) Appl. No.: 10/785,359

(22) Filed: Feb. 23, 2004

(65) Prior Publication Data

US 2004/0164899 A1 Aug. 26, 2004

Related U.S. Application Data

(60) Provisional application No. 60/449,312, filed on Feb. 24, 2003.

(51) Int. Cl.
*G01S 5/02* (2006.01)
*G01S 7/292* (2006.01)

(52) U.S. Cl. .................. 342/417; 342/90; 342/192; 342/196; 342/13

(58) Field of Classification Search ............... 342/417, 342/90, 192–196, 13
See application file for complete search history.

(56) References Cited

U.S. PATENT DOCUMENTS

| | | | | |
|---|---|---|---|---|
| 3,699,574 A | * | 10/1972 | O'Hara et al. | 342/154 |
| 4,992,797 A | * | 2/1991 | Gjessing et al. | 342/192 |
| 5,448,760 A | * | 9/1995 | Frederick | 455/410 |
| 5,867,118 A | * | 2/1999 | McCoy et al. | 342/90 |
| 6,222,481 B1 | * | 4/2001 | Abrahamson et al. | 342/90 |
| 2002/0140605 A1 | * | 10/2002 | Kozlov et al. | 342/417 |
| 2003/0050902 A1 | * | 3/2003 | Buczak et al. | 706/13 |

* cited by examiner

*Primary Examiner*—Thomas H. Tarcza
*Assistant Examiner*—F H Mull
(74) *Attorney, Agent, or Firm*—Steins & Associates, P.C.

(57) ABSTRACT

A Direction Finding DF Method and System Using Transmission Signature Differentiation is disclosed. Also disclosed is system that is able identify which signal is coming from which transmiitter. Futhermore, the syatem can take each respective transmitter's Line-of-Bearing (LOB) data and process them separately. The system is further capable of being fully automated in order to reduce to processing time and eliminate the necessity of human intervention. In an alternative embodiment of the present invention the system can feasibly be remotely controlled by a network such that the information can be collected from other from similar systems. In this way, a far more efficient DF System can be achieved in which multiple transmitters' positions can be determined one quickly from a centralized command facility.

14 Claims, 5 Drawing Sheets

DIRECTION FINDING METHOD AND SYSTEM USING TRANSMISSION SIGNATURE DIFFERENTIATION

This application is filed within one year of, and claims priority to Provisional Application Ser. No. 60/449,312, filed Feb. 24, 2003.

BACKGROUND OF THE INVENTION

1. Field of the Invention

This invention relates generally to Emitter Locating Systems and, more specifically, to a Direction Finding Method and System Using Transmission Signature Differentiation.

2. Description of Related Art

Direction Finding (DF) Systems are used to find the direction towards emitting radio transmitters. But today's systems cannot automatically differentiate between two or more transmitters utilizing the same frequency (which can be a common situation). This leads to errors and false measurements. This invention provides a method of automatically resolving the ambiguity created by multiple DF transmitters transmitting on the same frequency, and then enabling the DF System(s)s to identify the transmitters' respective lines-of-bearing (LOBs).

The basic components of a DF System are: (1) a DF antenna array; (2) a DF receiver/processor (hereafter referred to simply as "DF receiver"); (3) some device to interpret the streaming Line-Of-Bearing (LOB) data sets from the DF Set; (4) some sensor device to determine the DF Set's location; and (5) some sensor device to output the DF Set's orientation relative to true North.

The major sources of measurement errors in real-world DF Systems are: (1) uncertainties from the DF antenna array due to frequency dependent variations; and (2) signal reflections, also known as multi-path. In practice though, multi-path typically represents the largest source of error. Where multiple transmitters are transmitting on the same frequency, the resultant confusion (in prior systems) is very similar to the confusion caused by large multi-path signals.

In today's DF Systems, multiple transmitters utilizing the same frequency would require an operator to manually distinguish between the resultant ambiguous readings. It should be further noted that with today's digital systems, it could be impossible to manually identify different transmitters utilizing the same frequency because these new digital transmissions have very short transmission periods.

The invention described herein uses an improved method and technique to intelligently process data from one or multiple DF Systems so that multiple transmitters radiating alternately on the same frequency can be distinguished—in an automatic fashion.

In conclusion, insofar as the inventor is aware, no invention formerly developed provides this unique application to resolve multiple radios transmitting on the same frequency in DF System measurements.

SUMMARY OF THE INVENTION

In light of the aforementioned problems associated with the prior systems and methods, it is an object of the present invention to provide a Direction Finding Method and System Using Transmission Signature Differentiation. The preferred system should be able to identify which signal is coming from which transmitter. Furthermore, the preferred system should take each respective transmitter's LOB data and process them separately. It is a further object that the system is capable of being fully automated in order to reduce the processing time and eliminate the necessity of human intervention. It is still an even further object that an alternative embodiment of the present invention can feasibly control the system remotely over a network in order to collect the same information from similar systems. In this way, a far more efficient DF System can be achieved in which multiple transmitters' positions can be determined more quickly from a centralized command facility.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Direction Finding Method and System Using Transmission Signature Differentiation.

Figure 1:
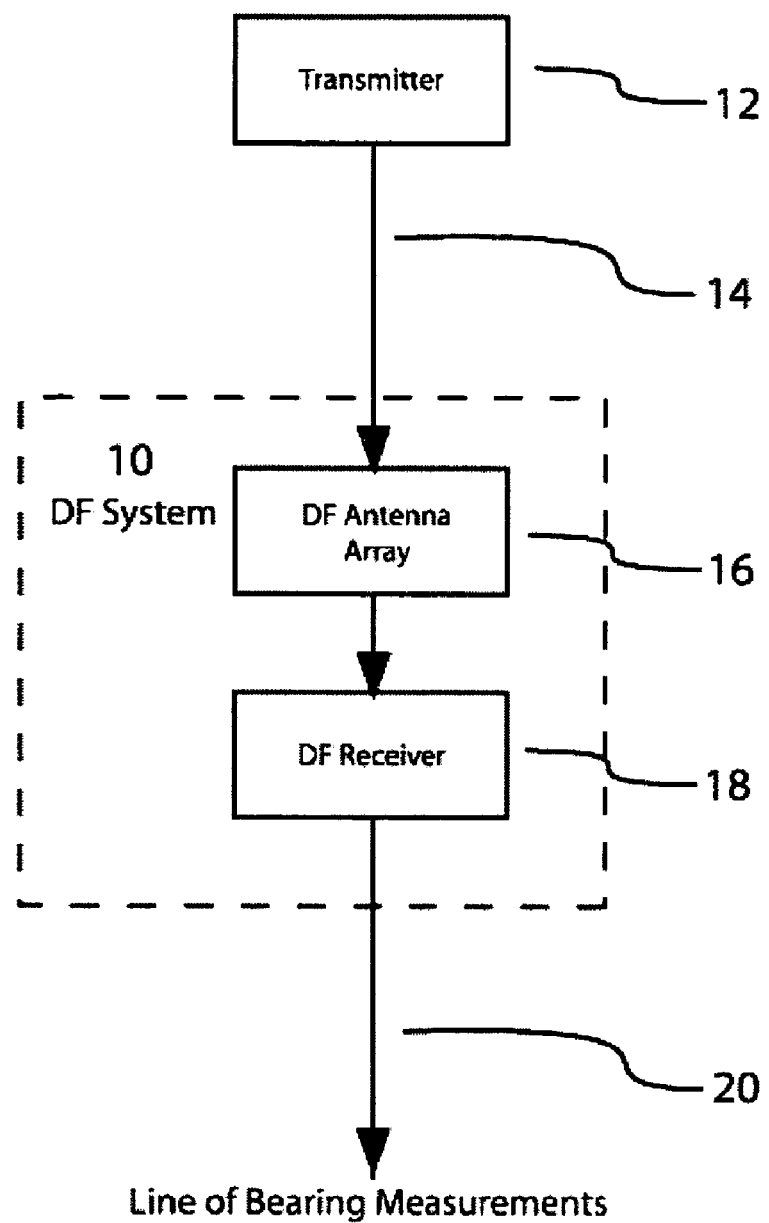
FIG. 1 is a drawing of a typical DF System.

The present invention can best be understood by initial consideration of FIG. 1. FIG. 1 depicts a typical DF System 10. A DF System is comprised of a DF antenna 16 which is connected to a DF receiver 18. The DF receiver 18 then outputs LOB data 20. The output LOB measurements 20 are either raw data, or averaged data.

It should be reiterated and understood that present-day DF Systems cannot resolve the measurement ambiguity of multiple transmitters on the same frequency, without manual operator intervention. What is needed therefore in order to fully optimize these DF systems is the enhanced ability to identify which transmitter is which, and then to segregate each of their respective measurements from each other. This is performed by the invention presented herein below.

Figure 2:
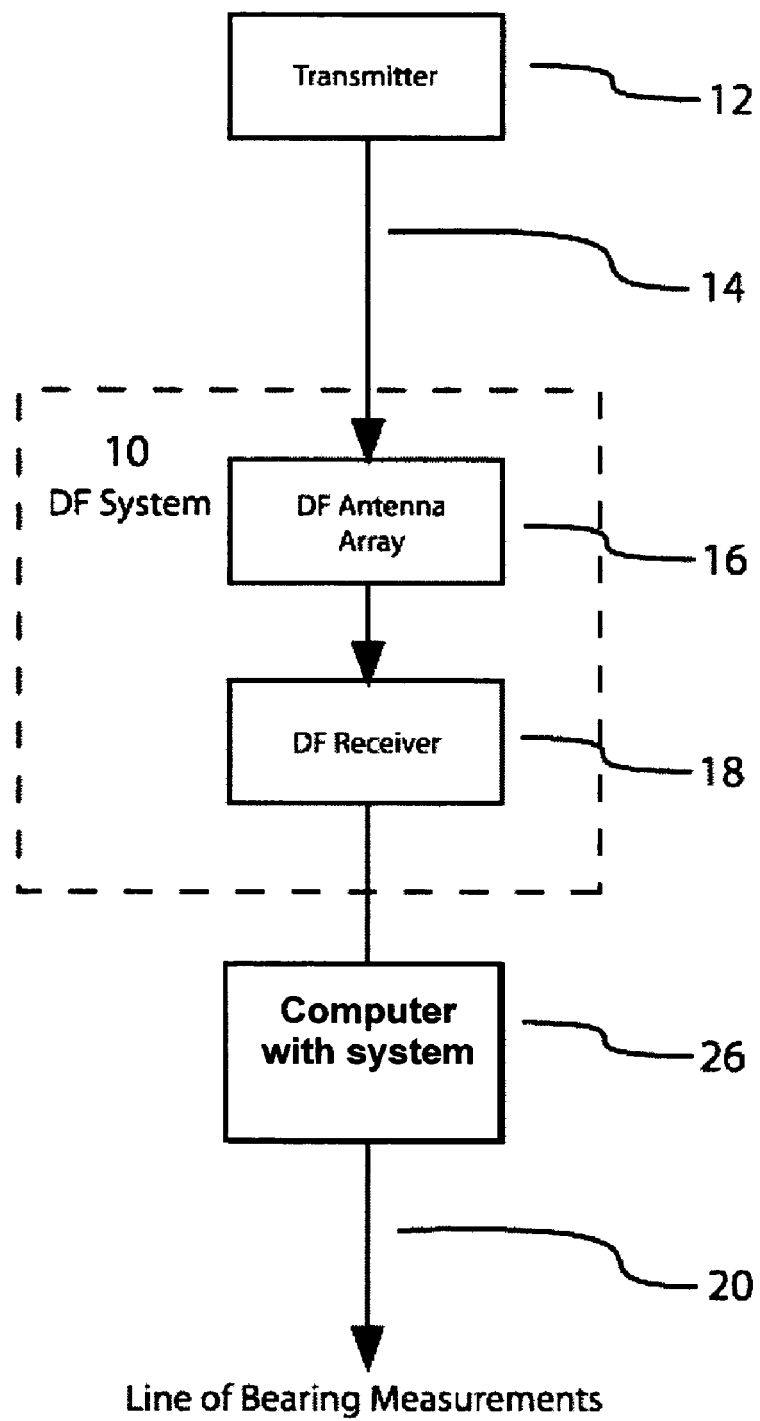
FIG. 2 is a drawing of a DF System augmented with the method and system of the present invention.

FIG. 2 is a drawing of a DF System augmented with the transmission signature classification system of the present invention 26. Thus, the LOB data 20 is processed by the computer containing the configuration necessary to resolve multiple transmitters.

Figure 3:
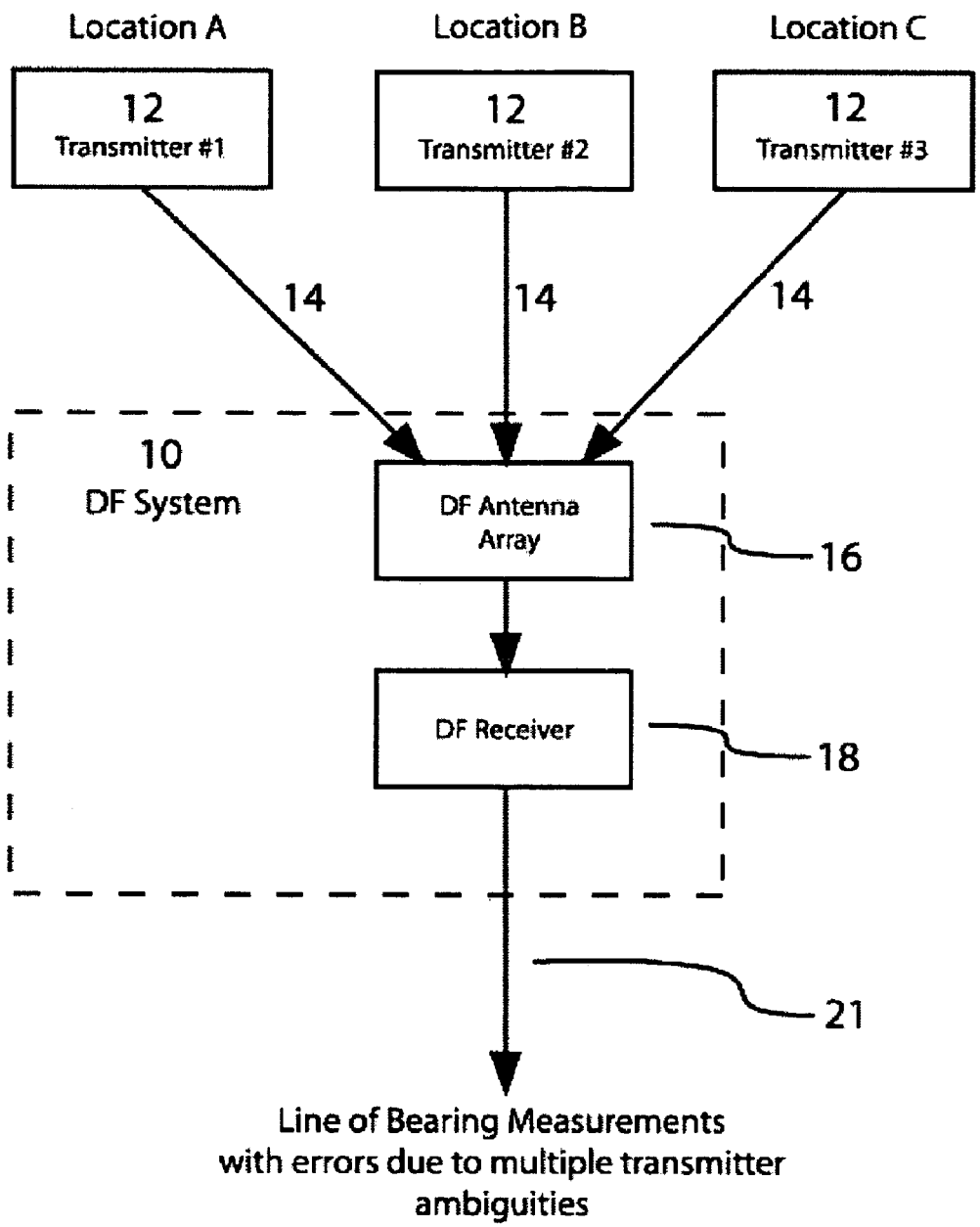
FIG. 3 is the conventional DF system of FIG. 1, but where the system is receiving signals from several different transmitters in different locations.

FIG. 3 is the conventional DF system 10 of FIG. 1, but where the system 10 is receiving signals from several different transmitters situated in different locations. As indicated, the DF System 10 cannot resolve which signal belongs to which transmitter.

Figure 4:
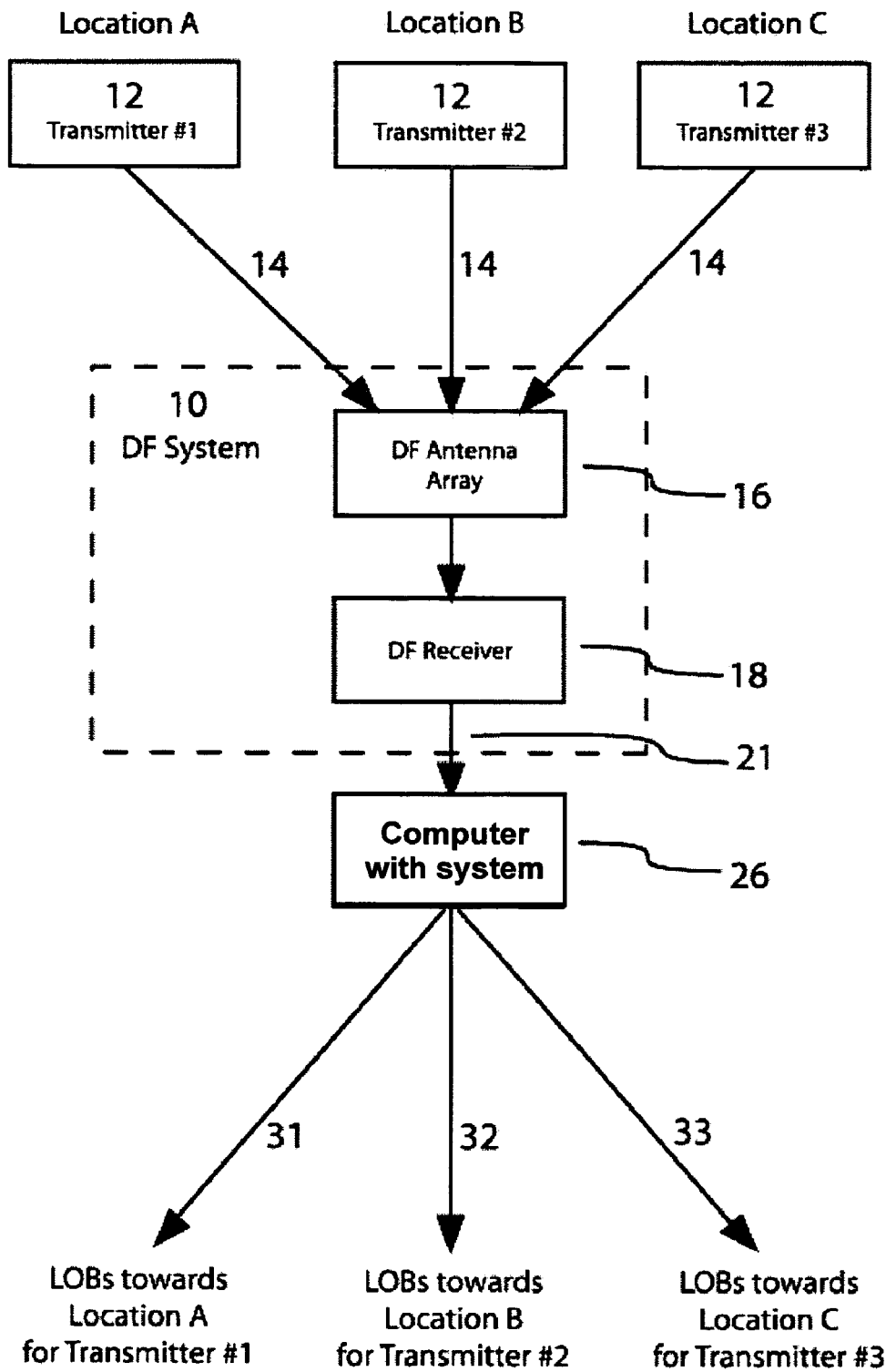
FIG. 4 depicts the operation of the system of the present invention.

FIG. 4 depicts the operation of the system of the present invention 49. In this case, the DF System 10 contains additional functionality to automatically resolve multiple transmitter. The various transmitters' LOBs are thus automatically calculated with use of this invention.

FIG. 4 is a drawing of the invention in action. In this drawing, the DF System is setup just like in FIG. 3. But this time it has computing device 26 which processes the LOB data 21 from the DF receiver 18. Computer 26 is specially configured to create and organize the signature(s) of the incident transmissions 14. Since the device 26 can now provide transmitter-specific LOB data, an operator can distinguish which LOB signal belongs to which transmitter because the system 49 will plot the LOB's 31, 32 and 33 to have visual attributes that are distinct from one another.

Figure 5:
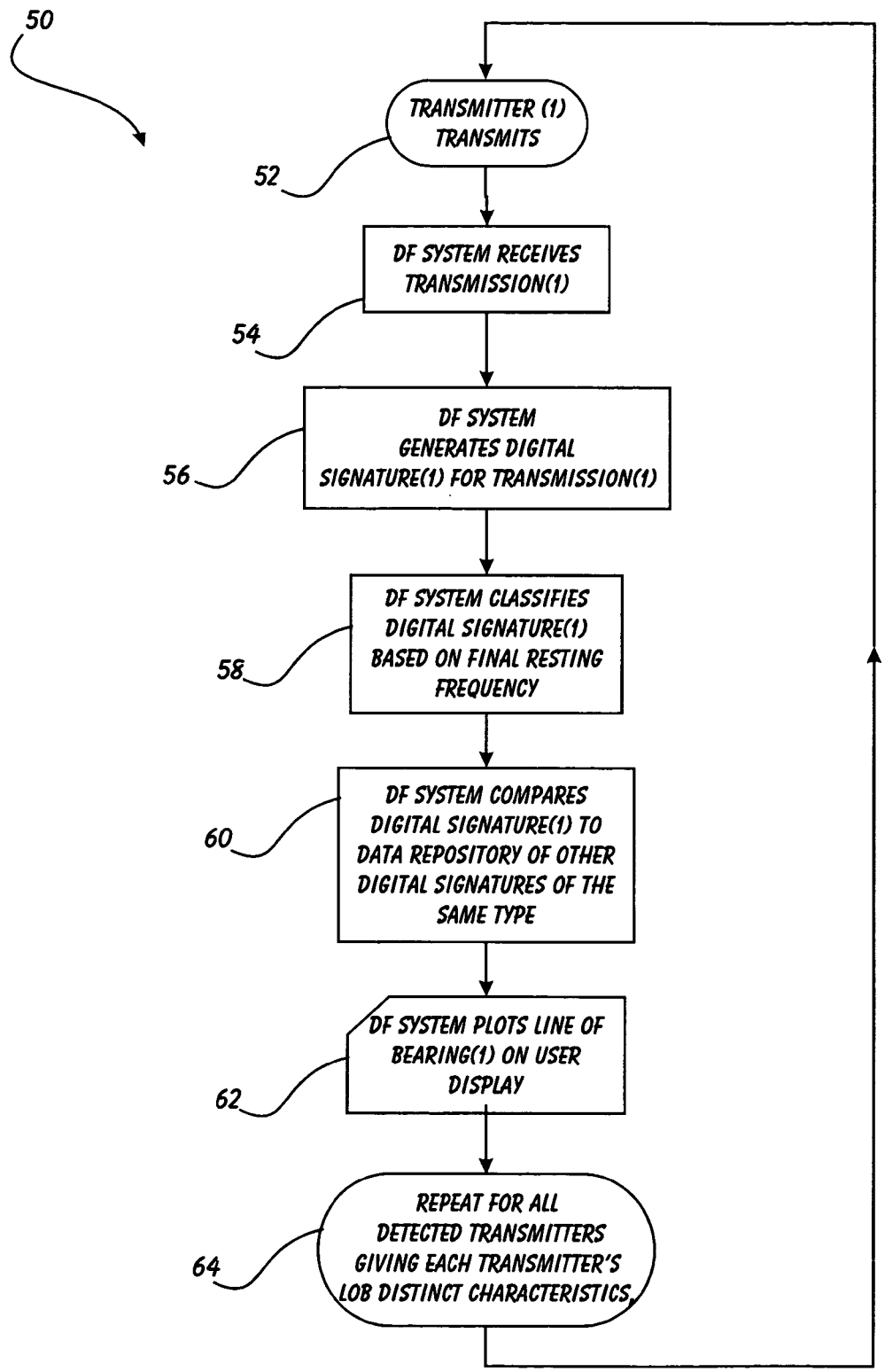
FIG. 5 depicts the method of the present invention.

As depicted in FIG. 5, this invention employs a specialized computer-executed method to process the LOB data that is continually being stored. The method utilizes a function to recognize the transmitter signature of each reading. Each transmitter has a unique "keying" signature as its oscillator reaches its final frequency. The method of this invention will record this signature every time it takes a measurement and store it in a database along with the position of the DF Set and the LOB to the transmitter. Such a "transmitter signature" device is the topic of a provisional patent application entitled: "Improved Method for Identifying Emitters Through Transmission Signatures," the contents thereof incorporated herein by reference.

According to the Emitter Locating Method 50 of the present invention, first, transmitter(1) transmits 52 and is subsequently received by the DF system receiver 54. Next, the DF system generates a digital signature for transmission (1) 56. The digital signature is preferably generated by applying a Fast Fourier Transform to the received transmission (or a digitized representation of the received signal, if appropriate). The FFT application will result in a unique digital "signature" for the transmission and the transmitter that will capture the final resting frequency and keyup frequency characteristics of the transmitter through its transmission.

The digital signature of transmission(1) is then classified, preferably based upon transmission(1)'s final resting frequency 58. Once classified, this classification is used to more quickly focus on the "known" digital signatures to which digital signature(1) should be compared; this approach results in the comparison first being attempted with a small slice of all known digital signatures (those that are similar, or of the same type as digital signature(1)).

If a match to an existing transmitter is not found in the "known" transmitters data repository, then the DF system will create a new record for digital signature(1), which is the completion of the classification of the digital signature. Next, the DF system will plot a line of bearing from the DF receiver of the system to transmitter(1). Of course, the known data repository and user display could be conveniently interconnected with the DF system over a communications network, such that the plot and repository and be accessed and controlled remotely.

As new transmissions are detected by the DF system, the previously-described steps are repeated 64, either for transmitter(1) and/or for other transmitters.

In essence, each time a transmitter sends a signal, the DF System receives the transmissions, and then the method of the invention compares the transmitter keying signature to its known database of received signals. If the transmitter has a match with the database, then all signals and LOBs associated with this transmitter are placed in its own sub-database file for further processing. The result is that each transmitter will have its unique records of received signals and LOBs.

Thus, if multiple transmitters are used which all operate on the same frequency, the DF System can be aware of this ambiguity and resolve each different transmitter without operator intervention. As LOB data arrives, it can automatically be assigned to their respective database corresponding to each different transmitter and thus the DF System will not be confused.

For instance, when a transmitter is identified and the transmission signature is logged, then every time a signal is received from this transmitter, the system will only assign the correct LOB data for that particular transmitter when calculating its location. Furthermore, the directions to these respective transmitters can then plotted on a map display. Thus, the DF System operator is aware of the presence of all the different active transmitters when he sees multiple LOBs on the display (for example in different colors).

Diagram Reference Numerals

10 DF System
12 Transmitter
14 RF signals on frequency X
16 DF antenna array
18 DF receiver
20 Line-of-bearing (LOB) measurement data
21 Ambiguous LOB measurements
26 Computer with algorithm of this Invention
31 LOB data for transmitter #1 in Location A
32 LOB data for transmitter #2 in Location B
33 LOB data for transmitter #3 in Location C
50–64 The method of the present invention and the steps executed by it Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A direction-finding method comprising the steps of:
identifying a transmitter by its transmission characteristic; the method comprising the steps of:
receiving an incident transmission, said transmission defined by frequency characteristics including a final resting frequency, said transmission emanating from a spatially-defined bearing relative to said receiver;
generating a unique signature responsive to said characteristics of said transmission;
classifying said signature responsive to said final resting frequency; and
comparing said signature with a set of other transmission signatures; and
generating a transmitter-specific first line of bearing defined by said spatially-defined bearing and responsive to said comparing.

2. The method of claim 1, wherein said generating comprises generating said unique signature by applying a Fourier Transform to said received transmission.

3. The method of claim 2, wherein said receiving comprises receiving a transmission defined by at least a keyup frequency characteristic in addition to said final resting frequency.

4. The method of claim 3, further comprising:
a first generating step prior to said signature generating step, said first generating step comprising generating an intermediate frequency sample responsive to said received incident transmission, said intermediate frequency sample defined by said frequency characteristics; and
a second generating step prior to said signature generating step, said second generating step comprising generating a digital intermediate frequency sample based on said intermediate frequency sample.

5. The method of claim 4, wherein said signature generating step is responsive to said frequency characteristics of said digital intermediate frequency sample.

6. The method of claim 5, wherein said comparing step comprises comparing said transmission signature with a set of other transmission signatures, all of said other transmission signatures defined by a final resting frequency classification substantially the same as said transmission signature of said received transmission.

7. The method of claim 6, timber comprising a second comparing step, said second comparing step being executed when said set of other transmission signatures fails to comprise a transmission signature defined by a final resting frequency classification substantially the same as said transmission signature of said received transmission, said second comparing step comprising comparing said received transmission signature to one or more sets of other transmission signatures defined by final resting frequency classifications not substantially the same as said transmission signature of said received transmission.

8. The method of claim 7, farther comprising a data repository addition step after said second comparing when said set of other transmission signatures fails to comprise a transmission signature substantially the same as said transmission signature of said received transmission, said data repository addition step comprising adding said transmission signature of said received transmission to a data repository.

9. The method of claim 8, wherein said data repository addition step comprises adding said transmission signature of said received transmission to a set of said data repository defined by said final resting frequency of said received transmission.

10. The method of claim 9, further comprising repeating said identifying step and said line of bearing generating step for a second said transmitter, whereby a second line of bearing is generated.

11. The method of claim 10, further comprising displaying said first and second lines of bearing on a single operator display interface.

12. The method of claim 11, wherein said first line of bearing is visually distinct from said second line of bearing.

13. The method of claim 12, wherein said first and second lines of bearing are colored differently.

14. A emitter location system for determining the location of a source of an incident transmission signal, comprising:
a receiver a said receiving a said incident signal;
a transmission signature device said transmission signature device comprising:
an analog-to-digital converter device fir converting said incident signal into digital data format;
a fourier transform generator for generating a transmission signature of said received signal by applying a fourier transform to said digital data;
a matching system for matching said transmission signature of said transmission with a set of transmission signatures stored in a data repository associated with said matching system; and
a plotting device for plotting a line of bearing representative of the relative orientation between said receiver and said saute of said incident signals.

* * * * *